July 24, 1951  F. W. McCOMBIE  2,561,808
PUMP, COMPRESSOR, MOTOR OR THE LIKE
Filed May 1, 1946  6 Sheets-Sheet 1

Inventor
Frederick W. McCombie
By [signature]
Atty

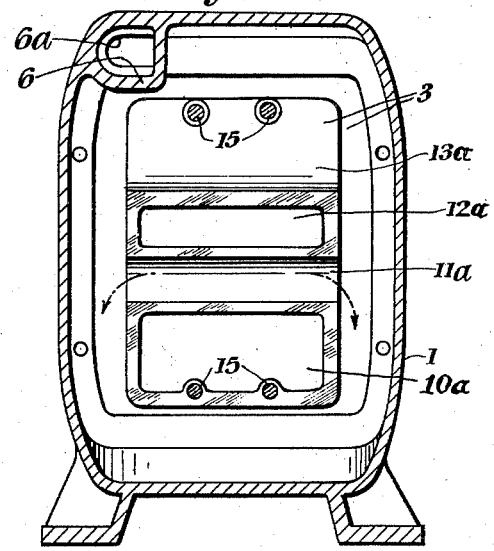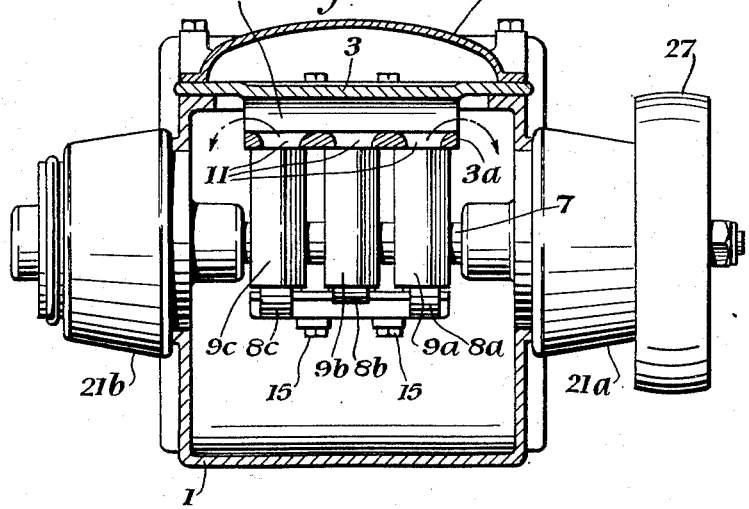

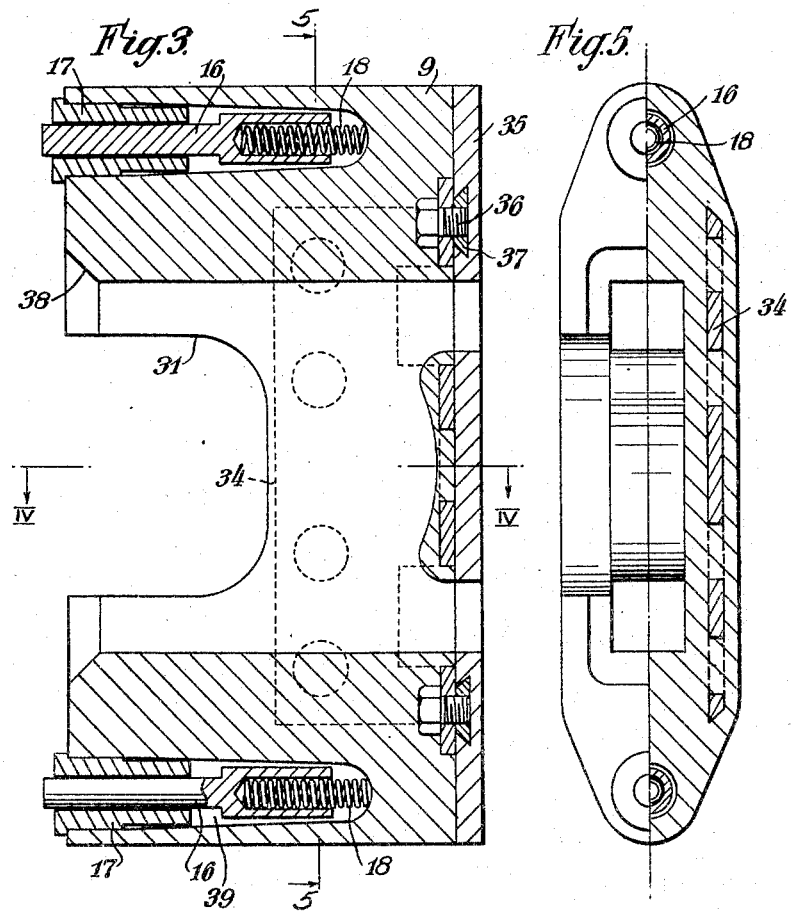

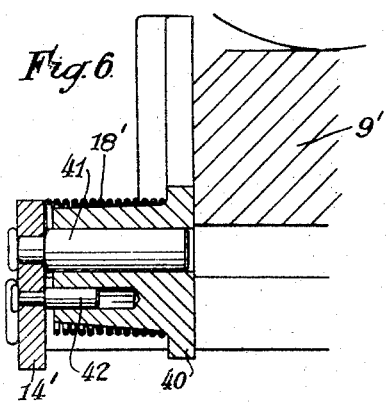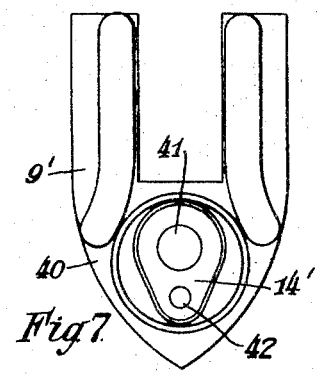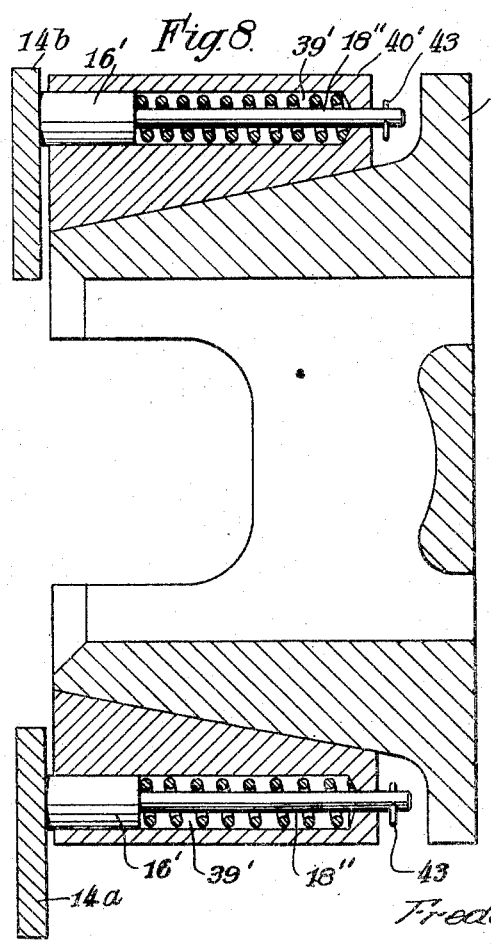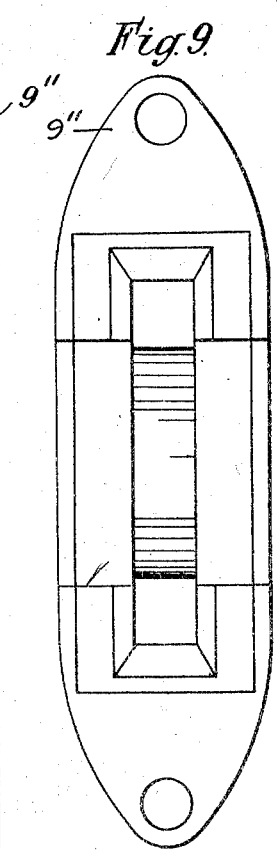

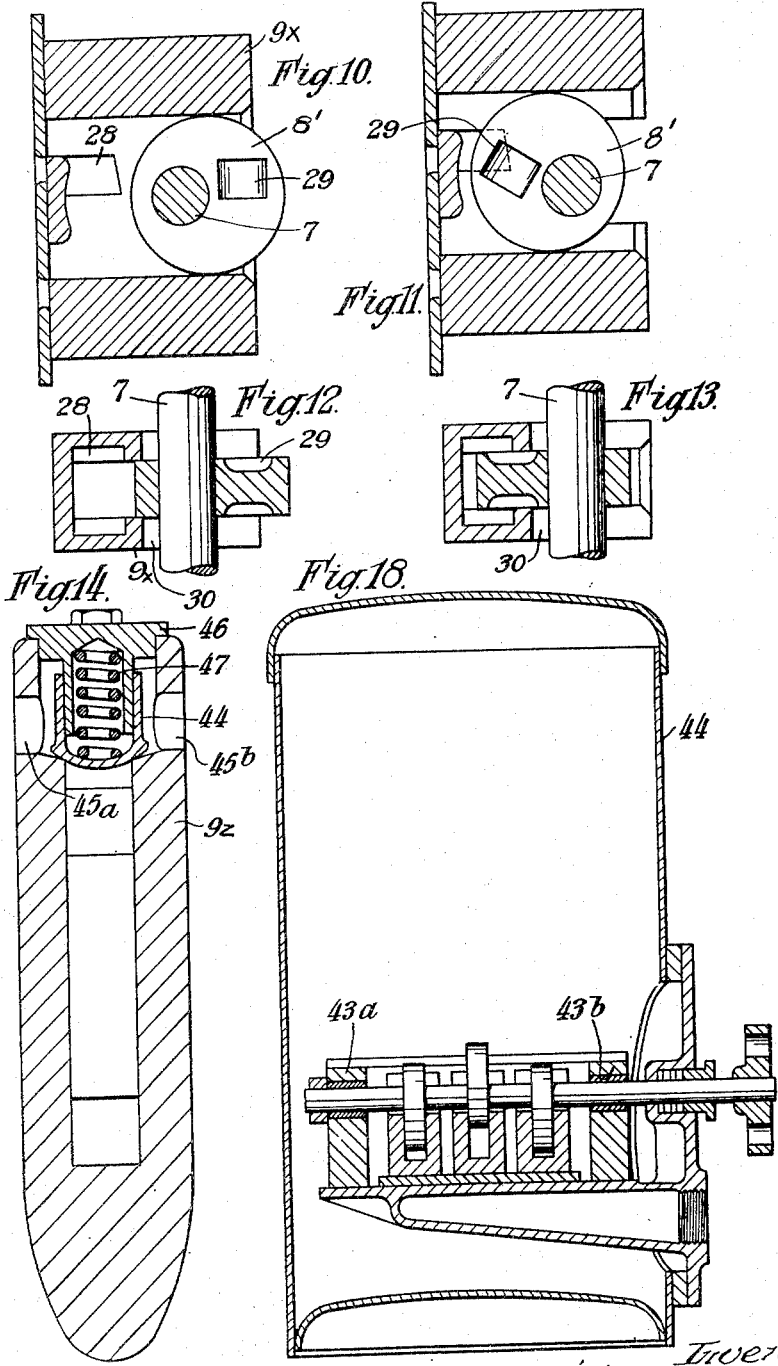

July 24, 1951 F. W. McCOMBIE 2,561,808
PUMP, COMPRESSOR, MOTOR OR THE LIKE
Filed May 1, 1946 6 Sheets-Sheet 6

Inventor:
Frederick W. McCombie
By [signature]
Atty.

Patented July 24, 1951

2,561,808

UNITED STATES PATENT OFFICE 2,561,808

PUMP, COMPRESSOR, MOTOR, OR THE LIKE

Frederick Walter McCombie, Ashton-on-Mersey, Manchester, England, assignor to Megator Pumps & Compressors Limited, Feltham, England Application May 1, 1946, Serial No. 666,363
In Great Britain May 4, 1945

25 Claims. (Cl. 103—163)

This invention has for its object to provide an improved machine which when driven by an external source of power can serve as a pump for liquids, or as a vacuum pump, blower or compressor for air or gases, or when supplied with fluid under pressure can serve as a motor.

A pump, compressor or motor according to the invention comprises a hollow member the interior of which defines an expansion or displacement chamber, an eccentric rotatably mounted therein and engaging the interior walls of said hollow member at two oppositely disposed points on the periphery of said eccentric to provide a substantially fluid tight seal and by virtue of its rotational movement within said hollow member giving rise to the desired displacement or expansion effect, said hollow member being mounted for reciprocating movement in the plane of rotation of said eccentric, and valve means controlling the flow of fluid to and from said chamber through suitable inlet and outlet ports.

The apparatus may include a single hollow member or a plurality in which latter case each chamber will contain an eccentric.

For some applications of the invention, particularly for use with gaseous fluids or low viscosity liquid fluids, a tight fit between each hollow member and its associated eccentric is advantageous for efficient operation. According to a preferred embodiment of the invention, such tightness is obtained by arranging and operating the machine so that the hollow member is contained within the pressure chamber and thus enveloped by fluid under pressure and by constructing the hollow member (which may be made for example of rubber, plastics or metal or combination thereof) to dimensions suitably related to the elasticity of the materials used so as to render the hollow member flexible or deformable under the difference of pressure between the inside and outside of the hollow member. In any case the hollow member may be lined with rubber or similar resilient material so as to assist in obtaining a tight seal.

Tightness between the hollow member and a guiding surface on the stationary part of the machine is obtained, in operation, by the difference in pressure between the pressure chamber and the suction chamber. Before operation, the hollow member may be retained by resilient means against said guiding surface to provide an initial seal and to hold the hollow member in position for assembly and dismantling.

In order that the invention may be clearly understood and readily carried into effect the invention is hereinafter described with reference to the accompanying drawings, in which:

Figure 2a is a cross-sectional view taken on line 2a—2a of Figure 2;

Figure 2b is a cross-sectional view taken on line 2b—2b of Figure 2;

Figure 3 is a section drawn to an enlarged scale and on the longitudinal centre line of one of the hollow members used in the embodiment shown in Figures 1 and 2;

Figure 4 is a transverse section on the line IV—IV in Figure 3;

Figure 5 is an end elevation partly in section, the section being taken on the line 5—5 in Figure 3;

Figures 6 and 7 illustrate in section and front elevation a modified form of retaining mechanism;

Figure 8 is a longitudinal vertical section of an alternative form of hollow member;

Figure 9 is an end elevation of the same the retaining mechanism being removed;

Figures 10 and 11 illustrate in section an alternative form of hollow member and eccentric in two working positions;

Figures 12 and 13 are sectional plan views of the same;

Figure 14 illustrates in section a further form of hollow member;

Figure 18 illustrates diagrammatically the application of a machine in accordance with the invention to the receiver of a compressor.

Figure 1:
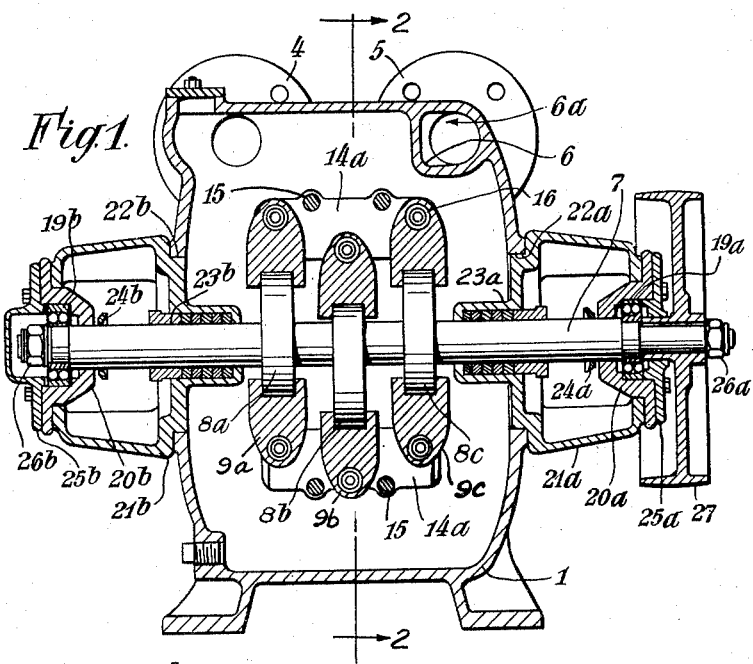
Figure 1 is a cross-sectional view taken vertically through the axis of an embodiment of the present invention and on a plane corresponding to line 1—1 of Figure 2.
Figure 2:
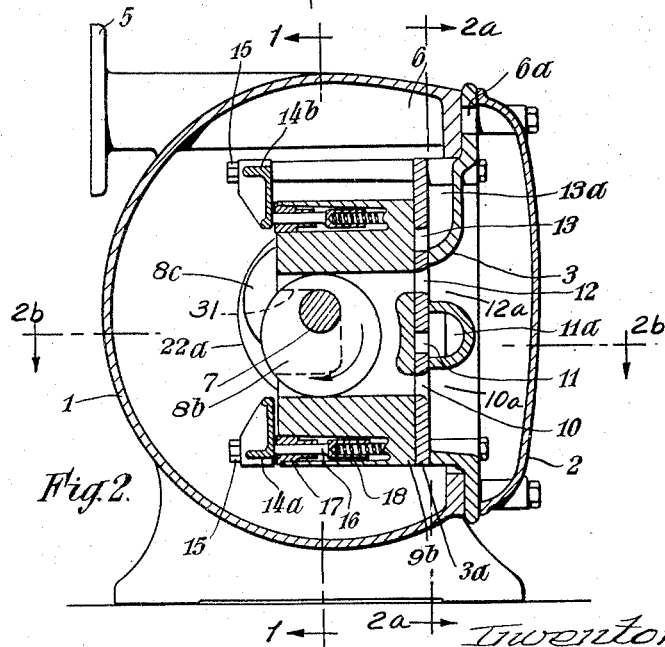
Figure 2 is a cross-section view taken on line 2—2 of Figure 1.

Referring first to Figures 1 and 2, the casing 1 forms the high pressure chamber of the machine and the cover 2 forms the low pressure or suction chamber, a partition wall 3 being interposed between the said casing and cover to separate the chambers. The pressure branch 4 is connected directly with the pressure chamber 1 while the suction branch 5 is connected with the suction chamber by a duct 6 which may be integral with the casing 1 and which leads into the suction chamber via a port 6a in the partition wall 3.

The rotor consists of a shaft 7 carrying, for example, three eccentrics 8a, 8b, 8c angularly offset with respect to one another by 120° to give a more uniform delivery and torque, each eccentric being diametrically surrounded by one of the hollow members 9a, 9b, 9c, respectively.

These hollow members bear against a partition plate 3a, at the inner surface of the partition wall 3, which thus serves as a guiding surface for the reciprocating movement of the hollow members which is imparted thereto by the eccentrics. Ports 10, 11, 12 and 13 are arranged in plate 3a of which ports 10 and 12 coincide with openings 10a and 12a in the partition wall 3 and lead directly into the suction chamber inside the cover 2 while ports 11 and 13 lead, through ducts 11a and 13a respectively in the partition wall 3, into the pressure chamber inside the casing 1.

Brackets 14a, 14b are attached, by means of bolts 15, to the partition wall 3 and offer guiding surfaces parallel and opposite to that of plate 3a. As will be seen more clearly from Figure 3, plungers 16 are guided in bushes 17 inside the body 9 of each hollow member such as 9b, Figure 2. The inner end of each plunger 16 is made hollow to house a coiled compression spring 18. The whole arrangement forms a resilient retainer device holding the hollow member in contact with the guiding plate 3a, Figure 2.

The rotor shaft 7 is journalled in bearings 19a, 19b, retained by covers 25a, 25b in housings 20a, 20b which in turn are attached to lantern brackets 21a, 21b fitted into circular holes 22a, 22b of the body 1, the diameter of which holes exceeds the circumcircle of the three eccentrics to allow axial assembling and dismantling of the rotor and casing. Glands 23a, 23b are arranged at the inner ends of the brackets 21a, 21b respectively to tighten the passage of the shaft 7 from the interior of casing 1 to the open air. Spray rings 24a, 24b, prevent any liquid which might have seeped through the packing of glands 23a, 23b from reaching the ball bearings 19a, 19b. The inner ball races are retained on the shaft 7 by means of nuts 26a, 26b, and a pulley (or other driving member) 27 is keyed to one end of shaft 7.

The operation of the machine as illustrated in Figures 1 and 2 is as follows:

Supposing the machine is used as a pump, the pulley or driving member 27 is driven by an external source of power, say an electric motor, and the rotor shaft 7 is rotated in its bearings 19a, 19b. The hollow members are restrained from moving in a horizontal direction by the guiding surfaces 3a and 14a, 14b, and consequently perform harmonic oscillations in a vertical direction, the phases of which are staggered according to the angular offset of the eccentrics with respect to one another. The eccentric 8b is shown in Figure 2 in its lowest position. Assuming clockwise rotation, it is moving to the left, thus increasing the volume enclosed in hollow member 9b. Consequently liquid is drawn in, through ports 10 and 12, from the suction chamber 2, where it is replaced by liquid drawn in through duct 6 and port 6a from the suction branch 5. At the same time liquid is displaced by the eccentric 8b in the interior of the body 1 and forced to leave the pressure chamber through branch 4.

When the eccentric has completed its movement to the left of the position shown in Figure 2, the hollow member has reached its central position (not shown) when the ports 10 and 12 are closed by the adjacent portions of the hollow member, and the ports 11 and 13 are about to be placed in communication with the interior of the hollow member.

On its way in a clockwise direction from its extreme left position towards the extreme right position, the eccentric 8b displaces liquid from the interior of the hollow member 9b, through ports 11, 13 and ducts 11a, 13a into the pressure chamber, thus compensating for the equal displacement of liquid during the same period from the pressure chamber into the open end of the displacement chamber on the other side of the eccentric.

Before operation, the hollow members were already held resiliently against the guiding surface of plate 3a by the reaction of the spring-loaded plungers 16 against the retainer surfaces 14a and 14b. As soon as operation starts, the hollow members are pressed by the pressure difference between the pressure chamber 1 and the suction chamber 2 against the guiding surface, thus securing the required tightness. Instead of arranging ports 13 for the connection of the interior of each hollow member with the pressure chamber 1, the hollow member may be arranged so as to overrun the edge of the guiding surface 3a and thus to establish the aforesaid communication during a portion of the reciprocating movement of the hollow member.

If the hollow members are made of such material and to such dimensions as to be flexible or deformable under the pressure difference between outside and inside of the hollow members, the said pressure difference forces the inner walls of the hollow chambers against the sides and the periphery of the eccentrics thus securing tightness there also.

The plate 3a forming the guiding surface for the hollow member may be made adjustable from outside by the operator or by an automatic governor, with respect to the hollow member and/or portion 3 so as to control the timing and/or amount of delivery or admission of fluid. Such adjustment may, for example, be made by means of a threaded spindle passing out of the pressure chamber through a gland, or by a hydraulically operated piston or plunger.

In Figures 3, 4 and 5 an embodiment of a hollow member is shown on a larger scale. The body 9 of the hollow member is moulded in one piece, for example, from rubber. An insert 34, for example, of light metal, is moulded into the body 9. A plate 35, preferably made from plastics, is attached to the insert 34 by means of threaded screws 36 screwed into metal insets 37 dovetailed into the plate 35.

The rubber moulded body 9 gives the required flexibility while the insert 34 gives the walls of the hollow member greater strength to resist the pressure difference between the outside and the inside. The plastic plate 35 ensures low friction and wear between the hollow member and the guiding surface and the low specific gravity of the materials used for the reciprocal hollow member reduces the inertia forces.

The open end of the hollow member is cut out at 31 to allow clearance for the rotor shaft 7 (Figures 2 and 3) and chamfered or flared at 38 to facilitate the assembly with the eccentric. The plungers 16, bushes 17 and springs 18 are housed in recesses 39 of the body 9.

Referring now to Figures 6 and 7, the hollow member is denoted 9' and the fixed retainer bracket is 14'. A slidable retainer plate 40 is guided on the pins 41, 42, which are fixed to the bracket 14', and is pressed against the face of the hollow member 9' by a coiled compression spring 18'.

Referring to Figures 8 and 9, the hollow member 9'', which is made from resilient or flexible material, fits into the tapered interior of the slidable shell 40'. Plungers 16' are fitted into bores 39' of said shell 40' and are pressed by coiled compression springs 18'' against the fixed retainer brackets 14a, 14b. Split pins 43 limit the movement of the plungers 16' when the hollow member is removed from between the guiding surface 3a and the retainer brackets 14a, 14b. The tapered contact faces between the shell 40' and the hollow member 9'' provide a wedging effect for securing a tight seal between the hollow member 9'' and the eccentric.

Referring now to Figures 10 to 13, the eccentric 8' has a recess 29 on one side (or recesses on both sides) and the hollow member 9x has a corresponding recess (or recesses) 28 on its inner side wall, and clearance 30 along the shaft 7 of the rotor.

In the position shown in Figures 10 and 12 the recesses 28 and 29 do not register and the clearances 30 are closed by the side faces of the eccentric. The operation of the machine is then substantially the same as in the corresponding phase of the embodiment shown in Figures 1 and 2. When however the eccentric 8' reaches the position of Figures 11 and 13 the recesses 29 do register, on the one hand with the recesses 28 in the hollow member 9x, and on the other hand with the clearance 30, so connecting the interior of the hollow member to the surrounding pressure chamber during a portion of the operating cycle determined as desired by the relative positions of the recesses 28 and 29.

Alternatively the hollow member 9x may be fitted with one or more automatic discharge valves which open when the pressure in the hollow member exceeds the pressure in the pressure chamber. In the embodiment which is shown by way of example in Figure 14, the valve 44 slides on a guide 46 and closing is assisted by a spring 47. When the valve is open, the fluid passes from the hollow member into the pressure chamber through the ports 45a, 45b. Instead of being fitted to the hollow member, as shown in Figure 14, the valve may be in the guiding surface 3a in such a position that it is connected to the interior of the hollow member by means of a port during the delivery period. The admission of fluid to the hollow member may be controlled by a similar automatic valve in conjunction with a port in the guiding surface or by the motion of the displacement hollow member as already described.

The embodiment of Figures 10 to 13 and of Figure 14 respectively are particularly suitable for the application of the invention to a compressor or vacuum pump as they permit compression of the fluid inside the hollow member before the hollow member is placed into communication with the pressure chamber.

Figure 15:
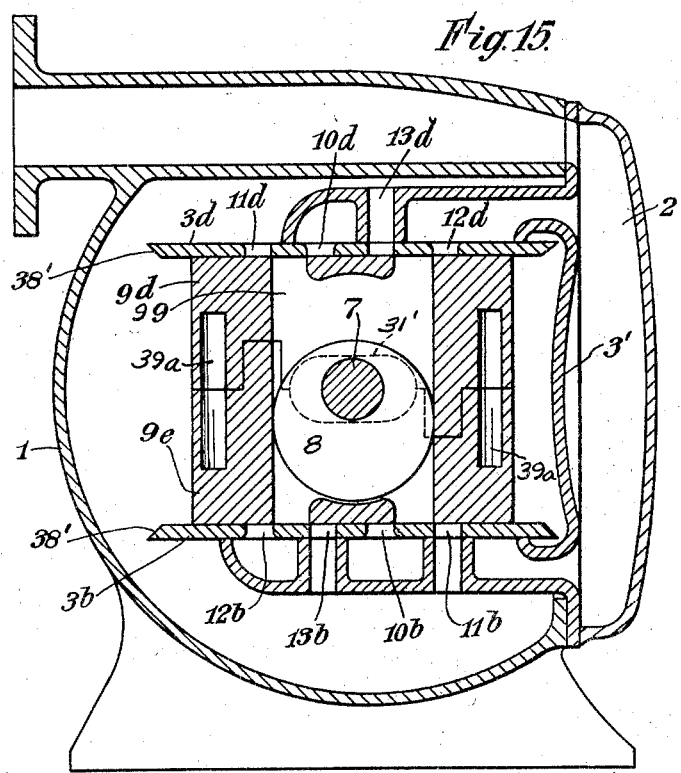
Figure 15 is a longitudinal vertical section of a double-acting form of machine in accordance with the invention.
Figure 16:
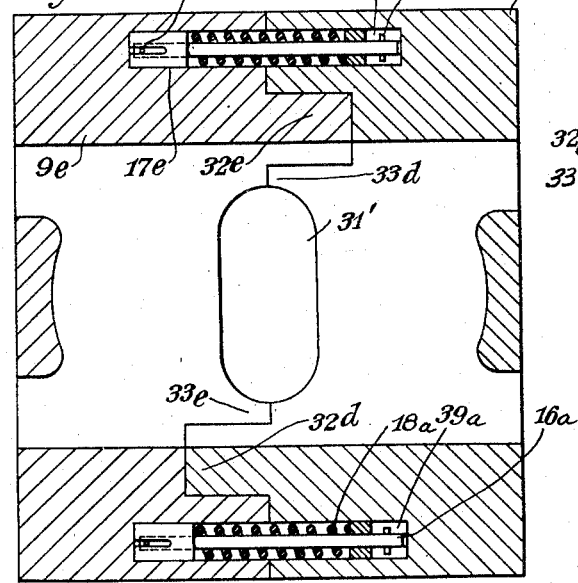
Figures 16 and 17 are a longitudinal section and transverse section respectively of the form of hollow member employed in the construction shown in Figure 15.
Figure 17:
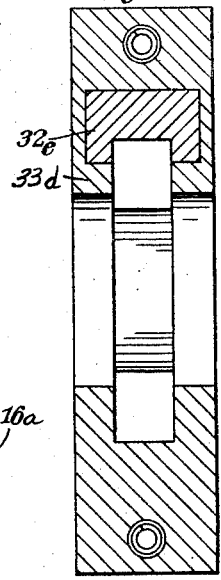

In the embodiment of Figures 15 to 17 a double-acting arrangement is shown. Two parallel and opposing guiding surfaces 3d, 3b are arranged, in this embodiment for example in a horizontal position and are straddled at one end by a partition wall 3'. Ports 10d, 12d and 10b, 12b respectively, are arranged in the guiding plates 3d, 3b to connect the interior 99 of the hollow member with the suction chamber 2. It will be noted that the location of the ports 10d, 12d differs from that of the ports 10b, 12b because the two sets of ports come into operation at different phases. Ports 11d, 13d and 11b, 13b, respectively, in the guiding plates 3d, 3b connect the interior 99 of the hollow member with the pressure chamber 1, again at different phases of the operating cycle.

The hollow member consists of two halves 9d and 9e fitted into one another as shown more in detail in Figures 16 and 17. The two halves fit closely into one another but are free to move relatively to one another in a direction normal to the reciprocating movement of the hollow member as a whole. The inner surfaces are in contact with opposite points of the circumference of the eccentric 8, the gaps between the halves 9d and 9e being staggered at the interior of the hollow member with respect to the general partition plane in the centre of the hollow member to prevent the contact points from overrunning these gaps.

Plungers 16a loaded by coiled compression springs 18a may be housed in recesses 39a in the halves 9d, 9e of the displacement chambers. The springs 18a bear against collars 17d, 17e which in turn abut against the ends of the recesses 39a, tending to force the halves 9d, 9e apart, i. e. against the guiding surfaces 3d, 3b (Figure 15). When the hollow member is not held between the guiding surfaces, further separation of the halves 9d, 9e is limited by pins 18d, 18e inserted into the plungers 18a (Figure 16). As can be seen more clearly in Figures 16, 17, the two halves of the hollow member are cut away to form an elongated slot 31' between them and so to give the required clearance for the shaft. The extensions 32e, 32d respectively of the two halves penetrate into corresponding recesses of the opposite half and are enveloped at their sides adjacent to the elongated slot 31' by lips 33d, 33e respectively, to prevent the formation of gaps through which leakage from the hollow member could occur.

In operation the eccentric 8 alternatively enlarges and reduces the internal volume of the parts of the interior 99 facing the guiding surfaces 3d and 3b respectively. This displacement, in a vertical direction in the arrangement of Figure 15, is accompanied by a horizontal harmonic reciprocation of the hollow member with respect to the guiding surfaces 3d, 3b. Assuming clockwise rotation, the eccentric on its movement from its lowest position as shown in Figure 15 into its highest position causes the hollow member to uncover the ports 10b, 12b in the lower guiding surface 3b so as to admit fluid from the suction chamber 2 into the lower half of the interior 99; the ports 11d and 13d in the upper guiding surface 3d are also uncovered to allow the efflux of liquid from the upper half of the interior into the surrounding pressure chamber 1.

When returning in a clockwise direction from the uppermost position (not shown) to the lowest position as shown in Figure 15, the eccentric carries the hollow member to the right, thus uncovering the suction ports 10d and 12d on the top guiding surface 3d and the pressure ports 11b and 13b on the bottom guiding surface 3b.

It will be noted that the edges of the guiding surfaces 3d, 3b are chamfered or flared at 38' so that the whole unit consisting of the part 3' and the two guide plates 3d, 3b can readily be pushed sideways over the hollow member after the two halves 9d, 9e of the chamber have been assembled over the eccentric 8.

The pressure of the surrounding pressure chamber penetrates into the outer portion of the gap between the two halves 9d, 9e and acts also on the surface of the elongated slot 31' thus forcing the two halves against the respective guiding surfaces 3d, 3b to ensure tightness in operation.

It is a characteristic of the machine that the casing 1, Figures 1, 2 and 15 does not function as a cylinder, abutment or similar working part but merely as a container. It may therefore be advantageous in certain instances for the rotor, hollow member and guiding surface to be arranged within the tank or receiver into which fluid is being delivered, thus dispensing with a casing for the machine, the functions of which are performed by the walls of the tank or receiver. An example of this embodiment of the invention is shown in Figure 18 which illustrates diagrammatically a construction particularly adapted for use as an air or gas compressor or as a combined liquid pump and air or gas compressor or as a pump delivering liquid into a receiver for storage under air or gaseous pressure. In such a construction the shaft of the rotor may pass through the walls of the tank or receiver by means of glands and the bearings for the rotor may be arranged internally as shown at 43a, 43b, Figure 18 or they may be arranged externally.

If the machine is used for operation with gaseous fluids, for example, as a compressor or vacuum pump, or as a pump delivering liquid into a receiver for storage under air or gaseous pressure, it may be advantageous to arrange it so that the working parts are wholly or partly submerged in a liquid fluid for lubrication and sealing and for cooling the gaseous fluid, the latter being drawn off from an opening in or stored in the upper part of the casing or receiver so that the liquid fluid remains in the lower part of the casing or receiver. For example in the construction shown in Figure 18, the lower part of the container 44 may contain the working parts wholly or partly submerged in liquid, while the upper part acts as a receiver for the gaseous fluid.

Although in the constructions hereinbefore described the hollow member has a straight line reciprocating movement it is within the scope of the invention to so construct the apparatus that the hollow member has an oscillatory or other movement along, for example, an arcuate or curved path and consequently the word reciprocating is used in a broad sense.

What I claim is:

1. A machine for use as a pump, compressor, blower or motor, comprising a casing, a partition dividing said casing into high and low pressure chambers, communication openings respectively for said high and low pressure chambers, an eccentric revolvably mounted in said casing, a hollow member slidably mounted in said casing against one surface of said partition and diametrically surrounding said eccentric to be reciprocated thereby over the surface of said partition, said member interiorly cooperating with said partition and the enclosed periphery of said eccentric to define an expansion chamber, guide means for maintaining said hollow member in contact with said partition during its reciprocal movement, and passage means connecting said expansion chamber with said high and low pressure chambers respectively and closable alternately during the reciprocatory travel of said member to control the flow of working fluid therethrough.

2. A machine for use as a pump, compressor, blower or motor, comprising a casing, a partition dividing said casing into high and low pressure chambers, communication openings respectively for said high and low pressure chambers, an eccentric revolvably mounted in said casing, a hollow member slidably mounted in said casing against one surface of said partition and diametrically surrounding said eccentric to be reciprocated thereby over the surface of said partition, said member interiorly cooperating with said partition and the enclosed periphery of said eccentric to define an expansion chamber, guide means for maintaining said hollow member in contact with said partition during its reciprocal movement, and passage means through said partition for connecting said expansion chamber with said high and low pressure chambers respectively and closable alternately by said member during its reciprocatory travel to control the flow of working fluid therethrough, said eccentric and hollow member being mounted in said high pressure chamber and subject to the pressure therein for assisting in maintaining said member tightly against said partition to seal the connection therebetween.

3. A machine as defined in claim 2, wherein said hollow member is composed of flexible material to be compressed around said eccentric by the pressure in said high pressure chamber.

4. A machine as defined in claim 3, wherein a rigid insert is embedded in the flexible material forming said hollow member and includes a bearing plate for sliding on said partition.

5. A machine as defined in claim 2, wherein said hollow member is composed of elastic material for snugly surrounding said eccentric and to be compressed around said eccentric by the pressure in said high pressure chamber.

6. A machine as defined in claim 2, wherein said guide means are supported by means carried by said partition.

7. A machine as defined in claim 2, wherein the hollow member comprises port means open to said partition and cooperative with said passage means.

8. A machine for use as a pump, compressor, blower or motor, comprising a casing, a partition dividing said casing into high and low pressure chambers, communication openings respectively for said high and low pressure chambers, an eccentric revolvably mounted in said high pressure chamber, a hollow member slidably mounted in said high pressure chamber against the surface of said partition and diametrically surrounding said eccentric to be reciprocated thereby over the surface of said partition, said member interiorly cooperating with said partition and the enclosed periphery of said eccentric to define an expansion chamber, guide means in said high pressure chamber for maintaining said hollow member in contact with said partition during its reciprocal movement, resilient means between said guide means and said hollow member for biasing said member into sealing engagement with said partition surface, and passage means through said partition for connecting said expansion chamber with said high and low pressure chambers respectively and closable alternately by said member during its reciprocatory travel to control the flow of working fluid therethrough.

9. A machine as defined in claim 8, wherein said resilient means comprises plungers movably mounted in bores in said hollow member, and springs in said bores and biasing said plungers against said guide means.

10. A machine for use as a pump, compressor, blower or motor, comprising a casing, a partition dividing said casing into high and low pressure chambers, communication openings respectively for said high and low pressure chambers, an eccentric revolvably mounted in said high pressure chamber, a rectangular sleeve member slidably mounted in said high pressure chamber and diametrically surrounding said eccentric to be reciprocated thereby, one end of said member abutting said partition for sliding over the surface of said partition and interiorly cooperating with said partition and the enclosed periphery of said eccentric to define an expansion chamber, the other end of said member being open to said high pressure chamber to expose said chamber to the action of said eccentric, guide means in said high pressure chamber for maintaining said hollow member in contact with said partition during its reciprocal movement, and passages through said partition for connecting said expansion chamber with said high and low pressure chambers respectively and closable alternately by said member during its reciprocatory travel to control the flow of working fluid therethrough.

11. A machine as defined in claim 10, wherein the opening through said sleeve member at the end open to the high pressure chamber is flared to facilitate assembly of the member on the eccentric.

12. A machine as defined in claim 10, wherein said eccentric and sleeve member are positioned below the normal liquid level in said high pressure chamber to be sealed by the liquid.

13. A machine for use as a pump, compressor, blower or motor, comprising a casing, a partition dividing said casing into high and low pressure chambers, communication openings respectively for said high and low pressure chambers, an eccentric revolvably mounted in said high pressure chamber, a hollow member slidably mounted in said high pressure chamber against the surface of said partition and diametrically surrounding said eccentric to be reciprocated thereby over the surface of said partition, said member interiorly cooperating with said partition and the enclosed periphery of said eccentric to define an expansion chamber, guide means in said high pressure chamber for maintaining said hollow member in contact with said partition during its reciprocal movement, ports in said partition and respectively opened alternately by said member during its reciprocatory travel to control the flow of working fluid therethrough, and ducts formed in said partition for connecting at least one of said ports with said high pressure chamber, with at least one port in direct communication with said low pressure chamber.

14. A machine for use as a pump, compressor, blower or motor, comprising a casing having an opening, a partition closing said opening to define with said casing a high pressure chamber, a shell secured to said partition to define therewith a low pressure chamber, communication openings respectively for said high and low pressure chambers, an eccentric revolvably mounted in said high pressure chamber, a hollow member slidably mounted in said high pressure chamber against the surface of said partition and diametrically surrounding said eccentric to be reciprocated thereby over the surface of said partition, said member interiorly cooperating with said partition and the enclosed periphery of said eccentric to define an expansion chamber, guide means in said high pressure chamber for maintaining said hollow member in contact with said partition during its reciprocal movement, and passages through said partition for connecting said expansion chamber with said high and low pressure chambers respectively and closable alternately by said member during its reciprocatory travel to control the flow of working fluid therethrough.

15. A machine as defined in claim 14, wherein said communication openings are formed in said casing, a port in said partition, and a duct integral with said casing and connecting one of said openings with said partition port to define the opening for said low pressure chamber.

16. A machine for use as a pump, compressor, blower or motor, comprising a casing having an opening, a partition wall covering said opening to define with said casing a high pressure chamber, an opening through said partition wall, channels integral with said partition wall and protruding into the area of said opening, a flat partition plate insertable through said casing opening and mounted on the inner side of said partition wall to cooperate with said channels to define ducts opening into said high pressure chamber, a cover mounted on said partition wall to define with said wall a low pressure chamber, communication openings respectively for said high and low pressure chambers, an eccentric removably mounted in said high pressure chamber, a hollow member insertable through said casing opening and slidably mounted in said high pressure chamber against the inner surface of said partition plate, said member diametrically surrounding said eccentric to be reciprocated thereby over the surface of said partition plate and interiorly cooperating with said partition and the enclosed periphery of said eccentric to define an expansion chamber, guide means in said high pressure chamber for maintaining said hollow member in contact with said partition plate during its reciprocal movement, and ports in said partition plate for connecting said expansion chamber with said low pressure chamber and with said ducts for communication with said high pressure chamber and closable alternately by said member during its reciprocatory travel to control the flow of working fluid therethrough.

17. A machine for use as a pump, compressor, blower or motor, comprising a casing, a partition dividing said casing into high and low pressure chambers and including two spaced parallel guide plates, communication openings respectively for said high and low pressure chambers, an eccentric revolvably mounted in said casing and between said guide plates, a hollow member slidably mounted between said guide plates and in sealed contact with the surfaces thereof, said member diametrically surrounding said eccentric to be reciprocated thereby along the surfaces of said guide plates and interiorly cooperating with said plates and the respectively opposite periphery portions of said eccentric to define two separate expansion chambers, and passages through said guide plates and partition for connecting said expansion chambers with said high and low pressure chambers respectively and closable alternately by said member during its reciprocatory travel to control the flow of working fluid therethrough.

18. A machine as defined in claim 17, wherein said hollow member is composed of two separable halves that are joined midway between the opposite sliding surfaces thereof.

19. A machine as defined in claim 18, wherein the joint between said halves is staggered and includes extensions protruding perpendicularly to the mean line of said joint to provide an overlap and permit separation of said halves, and spring means between said halves for biasing them apart and into sealing engagement with the respective guide plates.

20. A machine for use as a pump, compressor, blower or motor, comprising a casing, a partition dividing said casing into high and low pressure chambers, communication openings respectively for said high and low pressure chambers, a shaft rotatably mounted in said high pressure chamber, a plurality of spaced eccentrics fixed on said shaft, a plurality of hollow members slidably mounted in said high pressure chamber against the surface of said partition, each of said members diametrically surrounding one of said eccentrics to be reciprocated thereby over the surface of said partition and interiorly cooperating with said partition and the enclosed periphery of said eccentric to define an expansion chamber, guide means in said high pressure chamber for maintaining said hollow members in contact with said partition during their reciprocal movement, and passage means through said partition for connecting each of said expansion chambers with said high and low pressure chambers respectively and closable alternately by the respective member during its reciprocatory travel to control the flow of working fluid therethrough.

21. A machine as defined in claim 20, wherein said eccentrics are successively offset by uniform angles with respect to each other.

22. A machine as defined in claim 20, wherein said casing is provided with an opening for the axial passage of said shaft and eccentrics and a bearing and seal support is removably seated in said opening to close said casing.

23. A machine as defined in claim 1 wherein said passage means is through said partition and are closable by said member during its reciprocatory travel.

24. A machine as defined in claim 1 wherein said passage means includes a passage through said partition for connection with one of said chambers, and closable by said member during its reciprocatory travel, and a passage comprising passage portions in the sides of said eccentric and said member and which are cooperatively aligned during an angle of revolution by said eccentric for connection with the other of said chambers.

25. A machine as defined in claim 1 wherein said passage means includes a passage through said partition for connection with one of said chambers and closable by said member during its reciprocatory travel, and a passage through said member for connection with the other of said chambers, and a pressure responsive valve closing said member passage.

FREDERICK WALTER McCOMBIE.

REFERENCES CITED

The following references are of record in the file of this patent:

UNITED STATES PATENTS

| Number | Name | Date |
| --- | --- | --- |
| 779,900 | Bartlett | Jan. 10, 1905 |
| 1,240,211 | Horvath | Sept. 18, 1917 |

FOREIGN PATENTS

| Number | Country | Date |
| --- | --- | --- |
| 862,170 | France | Nov. 30, 1940 |